(No Model.) 6 Sheets—Sheet 1.

P. BOYD
DRAW BENCH FOR MANUFACTURING PIPE.

No. 575,389. Patented Jan. 19, 1897.

(No Model.) 6 Sheets—Sheet 3.
P. BOYD.
DRAW BENCH FOR MANUFACTURING PIPE.
No. 575,389. Patented Jan. 19, 1897.

WITNESSES: Chas. F. Miller, T. E. Gaither

INVENTOR, Peter Boyd by Dennis B. Wolcott Att'y.

(No Model.) 6 Sheets—Sheet 4.
P. BOYD.
DRAW BENCH FOR MANUFACTURING PIPE.
No. 575,389. Patented Jan. 19, 1897.
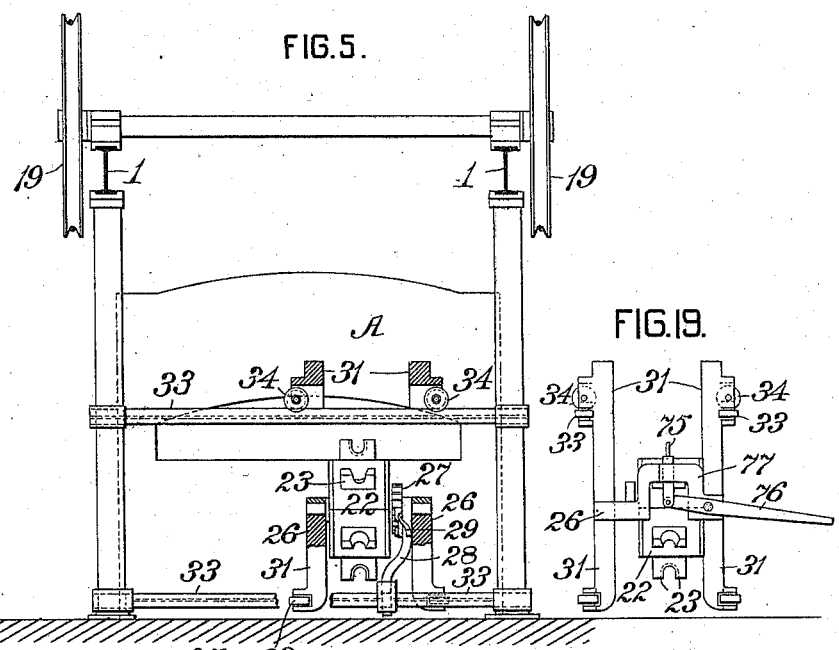
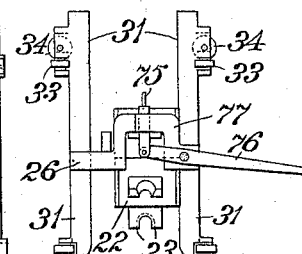
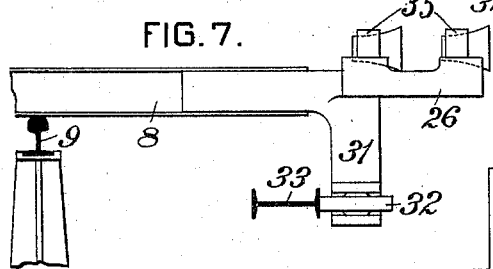
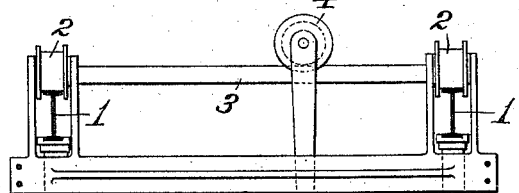
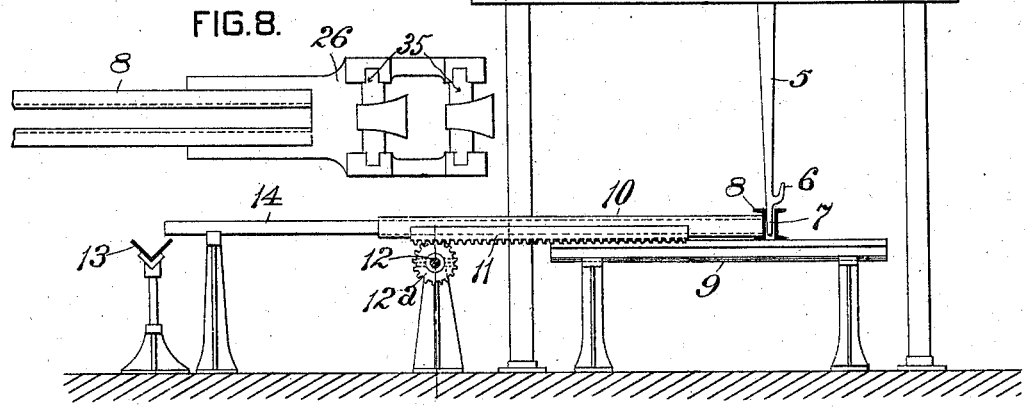
WITNESSES:
Chas. F. Miller.
F. E. Gaither
INVENTOR,
Peter Boyd
by Darwin S. Wolcott
Att'y.

(No Model.) 6 Sheets—Sheet 5.
P. BOYD.
DRAW BENCH FOR MANUFACTURING PIPE.
No. 575,389. Patented Jan. 19, 1897.
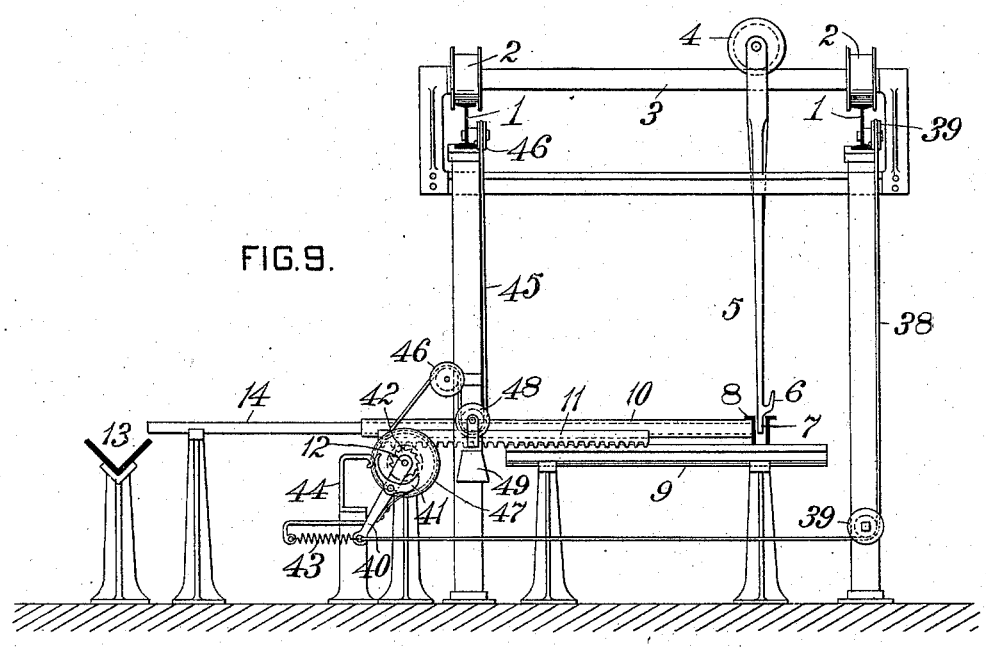
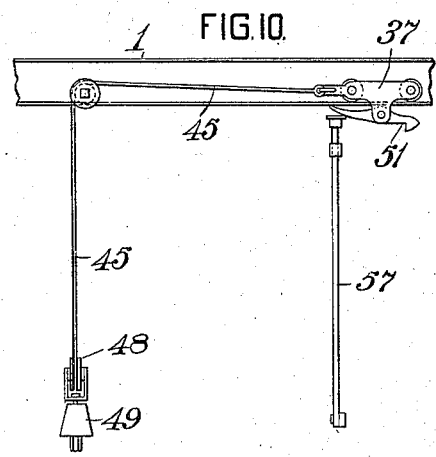
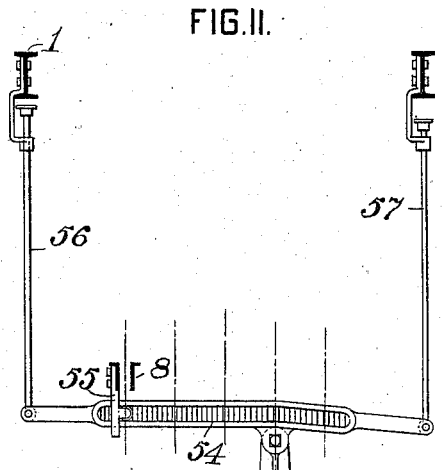
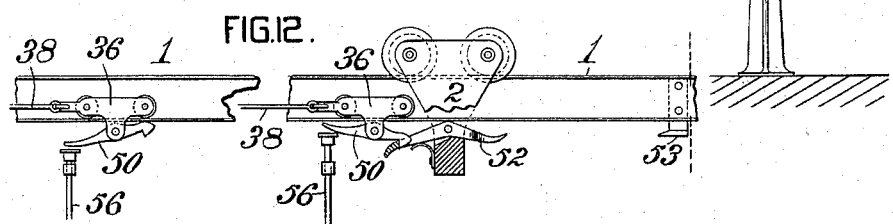
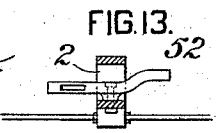
WITNESSES: INVENTOR,
Chas. F. Miller Peter Boyd
J. E. Gaither by Darwin S. Wolcott
Att'y.

(No Model.) 6 Sheets—Sheet 6.
P. BOYD.
DRAW BENCH FOR MANUFACTURING PIPE.
No. 575,389. Patented Jan. 19, 1897.
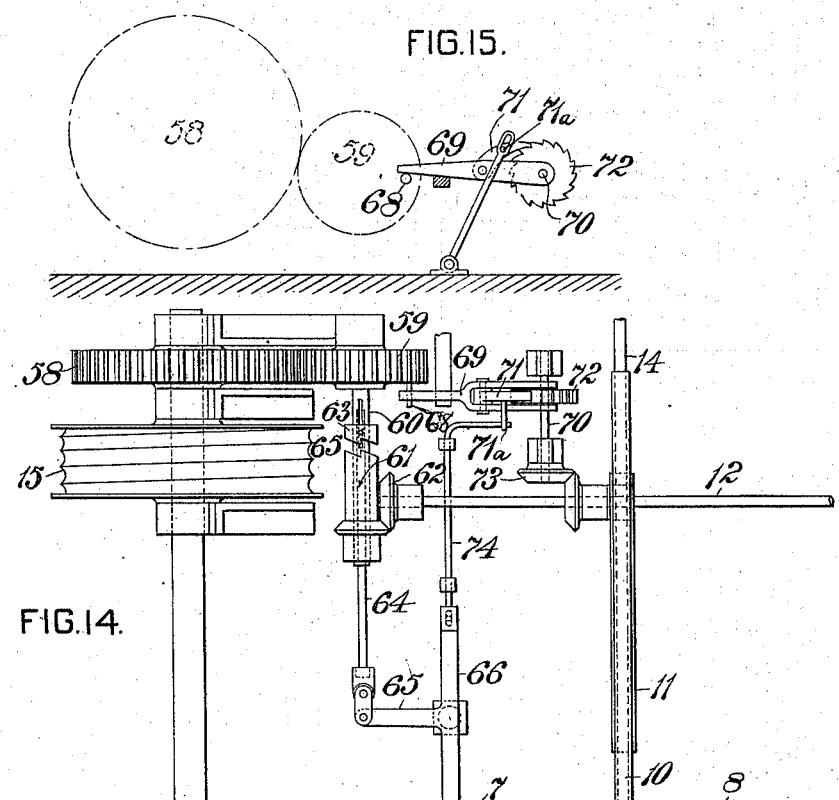
FIG. 15.
FIG. 14.
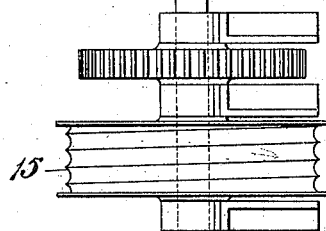
FIG. 21.
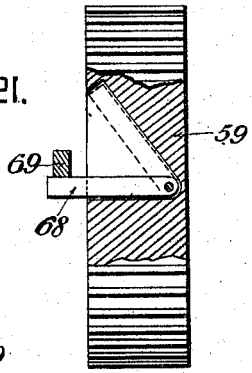
FIG. 16.
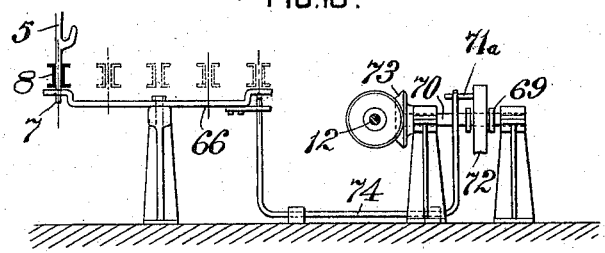
WITNESSES.
Chas. F. Miller.
F. E. Gaither.
INVENTOR.
Peter Boyd
by Dennis L. Wolcott
Att'y.
THE NORRIS PETERS CO., PHOTO-LITHO., WASHINGTON, D. C.

UNITED STATES PATENT OFFICE.

PETER BOYD, OF WHEELING, WEST VIRGINIA, ASSIGNOR TO THE RIVERSIDE IRON WORKS, OF SAME PLACE.

DRAW-BENCH FOR MANUFACTURING PIPE.

SPECIFICATION forming part of Letters Patent No. 575,389, dated January 19, 1897.

Application filed April 27, 1896. Serial No. 589,201. (No model.)

*To all whom it may concern:*

Be it known that I, PETER BOYD, a citizen of the United States, residing at Wheeling, in the county of Ohio and State of West Virginia, have invented or discovered certain new and useful Improvements in Draw-Benches for the Manufacture of Pipe, of which improvements the following is a specification.

The invention described herein relates to certain improvements on the draw-benches for the manufacture of pipe described and shown in Letters Patent Nos. 557,478 and 557,479. The apparatus set forth in said patents consists, generally stated, in a stationary draft mechanism provided with laterally-adjustable devices for connection with pipe-tangs or gripping-tongs, the bell-holders being stationary or adjustable, as desired.

The object of the present invention is to provide a laterally-adjustable bench or support over which the pipe can be drawn, and which will support the pipe at all points after leaving the die or bell until it has been released from the tongs, thereby preventing any distortion or bending of the pipe while in a highly-heated and soft condition.

It is a further object of the invention to provide a series of die or bell holders which can be brought in succession into operative position, such shifting of the die or bell holder being effected by the draft mechanism or by mechanism independent thereof.

Figure 1:
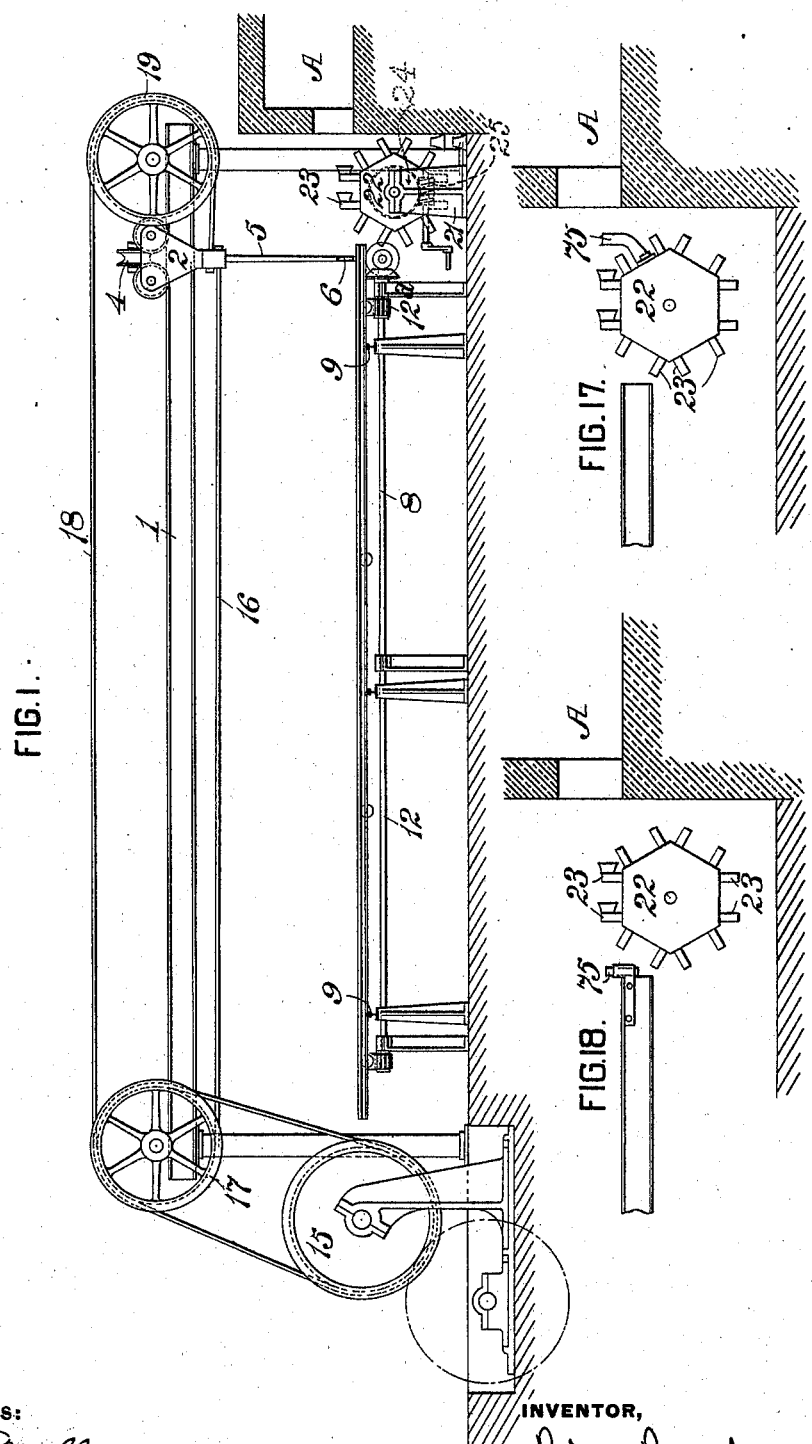
Figure 2:
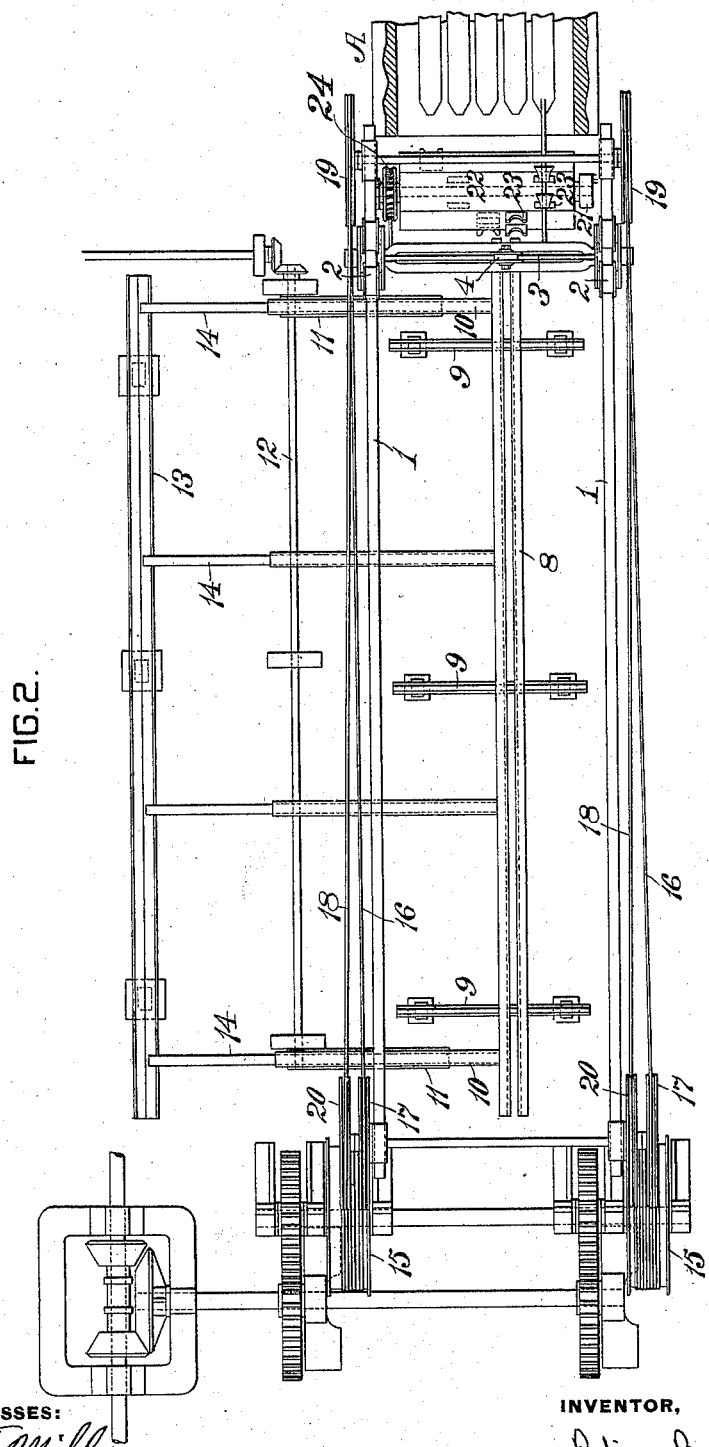
Figure 3:
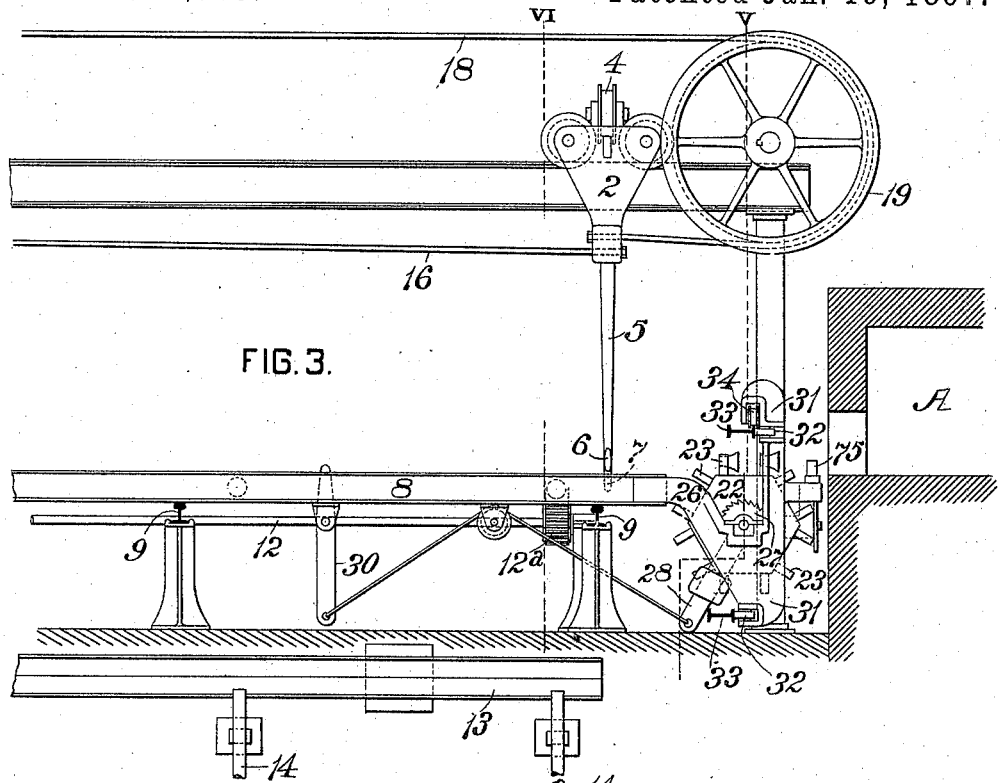
Figure 4:
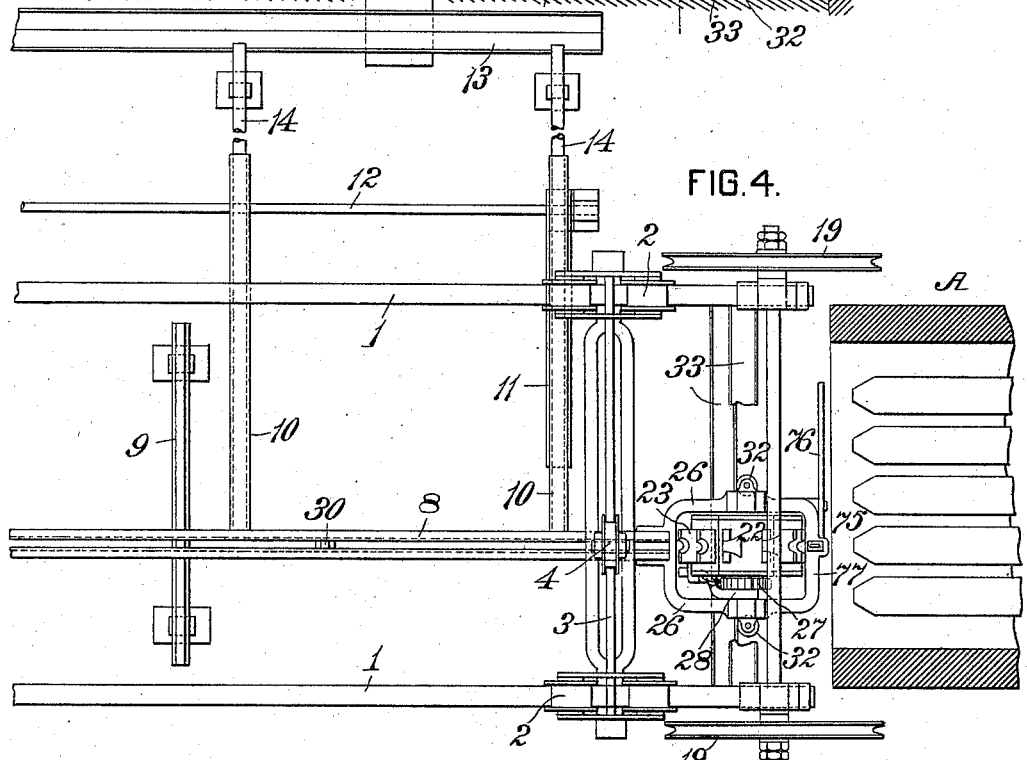

In the accompanying drawings, forming a part of this specification, Figure 1 is a side elevation of my improved apparatus, showing die or bell holders stationary as regards any movement along the face of the furnace. Fig. 2 is a top plan view of the same. Figs. 3 and 4 are views similar to Figs. 1 and 2, showing the adjustable die or bell holder mounted on the supporting-bench and movable therewith. Figs. 5 and 6 are sectional elevations, the planes of section being indicated by the lines V V and VI VI, Fig. 3, respectively. Figs. 7 and 8 are side elevations and top plan views, respectively, of the front portion of the movable bench, having stationary bell-holders secured thereon. Fig. 9 is a rear end elevation illustrating the mechanism for shifting the bench. Figs. 10, 11, 12, and 13 are detail views of the bench-shifting mechanism. Fig. 14 is a plan view of a modified form of bench-shifting mechanism. Figs. 15 and 16 are detail views of the same. Figs. 17 and 18 are detail views showing the arrangement of the gage-bar. Fig. 19 is a front elevation of the form of mechanism shown in Figs. 3 and 4. Fig. 20 is a detailed view of one of the releasing-fingers, and Fig. 21 is a sectional detailed view of the driving-pinion of the bench-shifting mechanism.

In the practice of my invention the heating-furnace A is constructed in the usual or any suitable manner and is provided in its front wall with an opening of a sufficient width to permit of the simultaneous withdrawal of two or more skelps, or of one of a series of skelps, without shifting its position laterally in the furnace. In front of this furnace and at right angles, or approximately so, to the furnace is arranged a pair of rails 1, on which are mounted blocks 2, preferably provided with suitable wheels riding on the rails. The rails are arranged a distance apart preferably somewhat greater than the opening in the wall of the furnace, and the blocks or trucks riding on said rails are connected by a cross-bar 3, on which is mounted a trolley 4. From this trolley depends a draft-bar 5, provided at its lower end with a hook 6 or other device, whereby the pipe-tang or gripping-tongs may be detachably connected to the bar. This bar is provided with a downward extension 7, which projects into a longitudinal slot in the laterally-movable pipe-supporting bench 8. This bench is supported upon rails 9, arranged parallel with the front of the furnace, and of a length somewhat greater than the width of the opening of the furnace, and to one side of the bench are secured tubes 10, which are adapted to serve as skids for supporting the pipes as they are moved from the bench to the trough 13. On the under side of these tubes are secured rack-bars 11, intermeshing with pinions 12ª on the shaft 12, whereby the bench is shifted laterally as desired. In addition to thus serving as a means for effecting the lateral movement of the bench these tubes serve as skids over which a completed piece of pipe can be shifted laterally to a trough 13. As the trough is stationary and the bench is laterally movable toward and from the trough, provision must be made for adjusting the length of the skids between the bench and trough. This is done by attaching one end of bars or tubes 14, of less diameter than the pipes or tubes 10, to the trough, the opposite ends of said pipes 14 being arranged within the tubes 10.

The blocks or trucks 2 are preferably shifted along their supporting-rails by means of flexible connections to winding-drums 15, as, for example, in order to move the trucks away from the furnace ropes 16 are connected thereto and pass backward around a guide-pulley 17 at the rear end of the supporting-rails 1, and thence around the winding-drum. In order to move the trucks toward the furnace, ropes 18 are connected thereto and passed forward around guide-pulleys 19, then back and around guide-pulleys 20 at the rear ends of the rails 1, and are then connected to the winding-drum in such manner that when the drum is rotated to wrap the rope 16 around it the ropes 18 will be unwound. When the drum is reversed, the ropes 18 will be wound on the drum and the rope 16 unwound.

Closely adjacent to the front of the furnace are secured two standards or uprights 21, provided with suitable bearings for the journals of the polygonal drum 22. On each face of this polygonal drum are secured one or two bell-holders 23, but in such manner that the bell-holders on one face will not be in line with those on any other face. It is preferred to arrange the bell-holders on adjacent faces a distance apart approximately equal to that at which adjacent skelps are arranged in the furnace, so that by rotating the drum the bell-holders will be brought into line with the skelp which is to be drawn. For example, as shown in Fig. 1, the uppermost bell-holder is in line with the skelp at one side of the furnace, the bell-holder on the next face is in line with the next skelp, and so on with the number of skelps and bell-holders employed. By this arrangement the skelps can be drawn in due succession, commencing from one side and continuing over to the other side, and during this operation the bell-holding drum will be rotated only once. While this construction and arrangement are preferred, the bell-holding drum may be constructed with any desired number of faces and without regard to the number of skelps which may be charged in the furnace at one time. On one of the journals of the bell-holding drum is secured a worm-wheel 24, adapted to mesh with the worm 25, whereby the drum is rotated.

In the construction shown in Figs. 3 and 4 the bell-holding drum 22 is mounted in brackets 26, secured to the front end of the pipe-supporting bench, and the holders for the welding-bell are arranged in line with each other. In order to rotate this drum, a ratchet-wheel 27 is secured to one of the journals of the drum, and a lever 28, provided with a pawl 29, arranged to engage the ratchet-wheel, is loosely mounted on the journal of the drum. The free end of this lever is connected by the rope or other suitable means to one end of a lever 30, which is so pivotally mounted to the bench that the opposite end thereof will project up into the path of the draft-bar of the drawing mechanism. The connections between the levers 28 and 30 are so arranged that when the lever 30 is shifted with the back movement of the draft-bar the lever 28 will not be moved, but when the draft-bar moves forward for engagement with a new skelp it will shift the lever 30 in such manner as to also shift the lever 28, and thereby rotate the bell-holding drum. The lever 28 is returned to normal or operative position by a weight or other suitable device. In order to prevent any longitudinal movement of the benches carrying the die or bell holders during the drawing operation, the brackets 26 are provided with vertical arms 31, projecting above and below the brackets and adapted to bear, preferably through the medium of friction-rollers 32, against horizontal rails 33, parallel, or approximately so, with the front of the furnace and having their ends tied to the latter in any suitable manner. It is preferred to arrange a friction-roller 34 in the upper arm in such manner as to bear upon the edge of the upper rail, thereby supporting the front portion of the bench, as clearly shown in Fig. 3.

As shown in Figs. 7 and 8, stationary bell or die holders 35 may be used on the movable bench in lieu of rotary drum carrying the bell-holders.

It is characteristic of my improvement that the draft mechanism is entirely independent, as far as regards its operation in pulling a pipe through the bell, of the pipe-supporting bench, and it is also characteristic of the improvement that the adjustable connection from the draft mechanism to the pipe-tang or pipe-gripping tongs is shifted by the pipe-supporting bench.

It will be observed that the bell-holding drum can be operated by the draft mechanism or entirely independent thereof, and that such operating mechanism may be employed for holding the drum stationary while a skelp is being drawn through the welding-bells. It is preferred to rotate the bell-supporting drum toward the furnace, so that the bells which have been employed in welding a pipe may be freely discharged therefrom, and the bells which are to be employed for that purpose will remain in position in the holders while the latter are being brought into operative position, thereby avoiding the use of any catches or retaining devices.

In order to facilitate the manufacture of pipe, it is preferred to automatically effect the lateral movement of the bench and the adjustable draft-bar into line with the several skelps in the furnace. This automatic movement may be effected in several ways, as, for example, in Figs. 9 to 14, inclusive, are shown mechanisms controlled and operated by the movable blocks or trucks 2. Buggies 36 and 37 are mounted on the rails 1, and one of these buggies, as 36, is connected by a rope 38, passing over guide-pulleys 39, to the outer end of an arm 40, loosely mounted on the shaft 12, on which are keyed the pinions intermeshing with the rack-bars 11, connected, as hereinbefore stated, to the bench 8. The arm 40 is provided with a pawl 41, adapted to engage a ratchet-wheel 42 on the shaft 12 when the arm is shifted by the buggy 36. The arm, and with it the buggy 36, is returned to normal or operative position by a spring 43, and the pawl is thrown out of operative position by a stop 44, against which the tail of the pawl strikes when the arm is drawn back by the spring, but the construction is such that the pawl will engage the ratchet-wheel as soon as the arm 40 is moved by the buggy 36. The buggy 37 is connected by a rope 45, passing around the guide-pulleys 46, to a drum 47 on the shaft 12. On the rope 45 between the guide-pulleys 46 is mounted a sheave 48, from which is suspended a weight 49, whereby the buggy 37 is returned to normal position, as will be hereinafter described. The rope is so attached to the drum as to rotate the shaft 12 in the opposite direction to that effected by the arm 40.

The buggies 36 and 37 are provided with pivotally-mounted hooks 50 and 51, with which spring-actuated hooks 52 on the blocks or trucks 2 will engage when the latter have reached the limit of their backward movement. In order to effect a disengagement of the hooks on the buggies from those on the blocks or trucks 2, fingers 53 are secured at suitable points on the rails 1 in such position that the bent tails of the hooks 52 will strike said fingers and be shifted out of engagement with the hooks 50 and 51. As the buggy 36 is employed for effecting a step-by-step lateral movement of the bench in one direction and the buggy 37 for effecting a return movement of the table to normal position, provision is made to prevent the simultaneous engagement of the hooks 50 and 51 by means of a lever 54, pivoted on a suitable post or standard in such relation to the bench that a finger 55 on said bench will engage a curved groove in the side of the lever 54. The ends of this lever are connected to vertical rods 56 and 57, whose upper ends are in line with the tails of the hooks 50 and 51 on the buggies 36 and 37 when the latter are at the rear limit of their movements. The tails of the hooks 50 and 51 are weighted, so that when free to move their front ends will be raised out of the line of movement of the hooks 52. The hooks 50 and 51 are adapted to be shifted to operative position by the rods 56 and 57 when raised by the lever 54.

While the bench 8 is being shifted from the left to the right in Fig. 9, the groove in the lever 54 is of such shape as to hold the left-hand end of the lever and its rod 56 up, thereby maintaining the hook 50 in operative position, as shown to the right in Fig. 12. The hook 50 is held in this position until the bench reaches its fifth or last position, when the lever 54 is shifted, thereby shifting hook 50 out of operative position and the hook 51 into operative position, so that when the blocks or trucks 2 reach the rearward limit of their movement in drawing the last skelp the hook 52 in line with the hook 51 will engage the latter, and as the blocks move to the front the buggy 37 will be drawn along with it, and by reason of the connection of the buggy 37 with the drum 47 the bench will be shifted back to its original position. This return movement of the bench will again shift lever 54, so as to bring hook 50 into operative position and shift hook 51 out of operative position. As soon as the hook 51 is released from the hook 52 the weight 49 will draw the buggy back to normal position, and as the shaft 12 is being rotated by the buggy 36 and the lever, pawl, and ratchet operated thereby, the rope 45 will be gradually wound onto the drum, so that the latter can be again shifted in due sequence.

In lieu of the construction shown in Figs. 9 to 13, inclusive, I may employ the mechanism shown in Figs. 14, 15, and 16. This mechanism is designed to be operated by the winding-drum shaft, and on this shaft is keyed a gear-wheel 58, which intermeshes with a pinion 59 on a short shaft 60. On this shaft 60 is loosely mounted a sleeve 61, having a beveled pinion formed integral therewith and adapted to intermesh with a corresponding pinion 62 on the shaft 12, which is employed to shift the bench 8, as hereinbefore described. On the shaft 60 is also mounted a sleeve 63, adapted to move along the shaft, but to rotate therewith, and the adjacent ends of the sleeves 61 and 63 are constructed to interlock with each other, so that when the shaft 60 is rotated in one direction the pinion and shaft 12 will also be rotated, but when the shaft 60 is rotated in the reverse direction the sleeve 63 will be automatically forced away from the sleeve 61. The shaft 60 is made hollow for the reception of the rod 64, and the latter is attached to the sleeve 63 by means of a pin passing through the sleeve, a slot in the shaft 60, and the rod 64. The outer end of this rod 64 has a swivel connection with an arm 65 of the lever 66, which is pivotally mounted, as shown in Fig. 16, upon a suitable standard, which is arranged in such relation to the line of movement of the bench and the draft-bar 5 that when the latter reaches the rear limit of its movement the downward extension 7 thereof will strike against the ends of the lever 66 and shift it, as hereinafter described. A pin 68 is pivotally mounted in the side of the pinion in such manner as to strike and lift the lever 69, which is loosely mounted on a short shaft 70 and provided with a pawl 71, adapted to engage a ratchet-wheel 72, keyed to the shaft 70. On one end of the shaft 70 is secured a beveled pinion 73, adapted to intermesh with a corresponding pinion on the shaft 12. As shown in Fig. 16, the lever 66 is so shaped that the downward projection 7 from the draft-bar 5 will strike said lever only in the first and last positions of the bench 8.

In describing the operation of this mechanism it will be considered that the bench is in its initial position, as shown in Fig. 16. As the draft-bar moves back to the rearward limit of its movement it will strike and shift the lever 66. By this movement of the lever a bent arm 74, having one end connected to one end of the lever 66 and its opposite end in engagement with a pin $71^a$ on the pawl 71, is so shifted as to throw the pawl 71 down into engagement with the ratchet-wheel 72, so that when the lever 69 is raised by the pin 68 the ratchet 72, shaft 70, and shaft 12 are shifted, thereby moving the bench 8 one step to the right. This step-by-step movement of the bench is effected on every backward movement of the draft-bar, or, rather, by every rotation of the drum which effects this backward movement of the draft-bar. As the draft-bar reaches the rearward limit of its movement when the bench is in the fifth or last position, as shown in Fig. 16, the downward extension 7 of the draft-bar will strike the end of the lever 66, and thereby so shift the bent arm 74 as to raise the pawl 71 out of engagement with the ratchet-wheel, and at the same time the arm 65 is so moved as to bring the sleeve 63 into engagement with the sleeve 61, so that on the reverse rotation of the drum required to shift the draft-bar to the front end of the bench the sleeve 61, pinion 62, and shaft 12 would be rotated in such direction as to return the bench 8 back to normal or initial position, as shown in Fig. 16. As the drum is reversed to pull the draft-bar back the rotation of the shaft 60 and sleeve 63 will be reversed, and the latter by reason of the inclined faces on the adjacent ends of the sleeves 63 and 61 will be forced away from the sleeve 61 without waiting for the operation of the draft-bar on the lever 66.

As shown in Fig. 21, the pin 68 will strike and raise the lever 69 only when the drum is rotated in such direction as to move the buggy toward the furnace. When the drum is reversed, the pin will strike the lever and be thrown back into the recess in the pinion.

In order to manufacture a form of tubing for which there has been of late a considerable demand, i. e., with a longitudinal slot, I provide for the location of what I term a "gage-bar" in the rear of the welding-bells. In the constructions shown in Figs. 1 and 2, where the bell-supports are arranged on a rotating drum, the gage-bar 75 for each pair of bells is preferably arranged on the face adjacent to that on which the bell-supports are secured, as clearly shown in Fig. 17.

In lieu of arranging the gage-bar in front of the bells it may be arranged in the rear thereof, as shown in Fig. 18, it being by preference secured to the front end of the bench 8. These gage-bars project up such a height as to enter into the pipe and prevent the welding together of the edges thereof, and when the gage-bar is arranged in the rear of the bells it will determine the width of the slots in the finished article.

In the construction shown in Figs. 3 and 19 the gage-bar is in one case attached to a lever 76, which is pivotally mounted on the front end of the bench in such manner that it can lift the gage-bar 75 up through a slot in the cross-bar 77, connecting the arms 26, which support the rotating drum. Where the stationary bells are used, the gage-bar can be arranged between or in the rear of the welding-bells, as desired. When arranged in front on the bell-supports, the gage-bars can be used as supports for shaping or welding bells.

I claim herein as my invention—

1. In an apparatus for welding and bending pipe, the combination of a die or bell holder, a draft mechanism stationary as against lateral movement, a laterally-movable bench and a draft-bar carried by and movable laterally on the draft mechanism by the movable bench, substantially as set forth.

2. In an apparatus for welding or bending pipe, the combination of a rotatable drum provided with a series of two or more die or bell holders, a draft mechanism and means for rotating the drum, substantially as set forth.

3. In an apparatus for welding or bending pipe, the combination of a rotatable drum provided with a series of two or more die or bell holders, a draft mechanism and means operated by the draft mechanism for rotating the drum, substantially as set forth.

4. In an apparatus for welding or bending pipe, the combination of a draft mechanism stationary as against lateral movement, a laterally-movable bench, a rotatable die or bell holder mounted on the bench and a draft-bar carried by and laterally movable on the draft mechanism, substantially as set forth.

5. In an apparatus for welding or bending pipe, the combination of a draft mechanism stationary as against lateral movement, a laterally-movable bench, a die or bell holder mounted on the bench and a draft-bar carried by and movable laterally on the draft mechanism by the bench, substantially as set forth.

6. In an apparatus for welding or bending pipe, the combination of a rotatable drum provided with a series of two or more die or bell holders arranged out of line with each other, means for rotating the drum and a draft mechanism, substantially as set forth.

7. In an apparatus for welding or bending pipe, the combination of a bench and mechanism operating automatically to shift the bench laterally, substantially as set forth.

8. In an apparatus for welding or bending pipe, the combination of a bench, mechanism for effecting a predetermined step-by-step lateral movement of the bench in one direction, and an independent mechanism for effecting a continuous movement of the bench laterally in the opposite direction to its original position, substantially as set forth.

9. In an apparatus for welding or bending pipe, the combination of a bench, mechanism for shifting said bench in either direction, mechanism to control said shifting mechanism to effect a predetermined step-by-step lateral movement of the bench in one direction, and independent mechanism to control said shifting mechanism to effect a continuous movement of the bench laterally in the opposite direction to its original position, substantially as set forth.

10. In an apparatus for welding and bending pipe, the combination of a bench, mechanism for shifting the bench laterally in either direction, mechanism for actuating the shifting mechanism to effect a predetermined step-by-step movement of the bench in one direction, and an independent mechanism for actuating the shifting mechanism to effect a continuous movement of the bench in the opposite direction to its original position, substantially as set forth.

11. In an apparatus for welding or bending pipe, the combination of a bench, mechanism operating automatically to effect a step-by-step movement of the bench in one direction, and mechanism operating automatically to effect a return movement of the bench, substantially as set forth.

12. In an apparatus for welding or bending pipe, the combination of a bench, mechanism for shifting the bench in one direction, mechanism for shifting the bench in the opposite direction, and means controlled by the movement of the bench for alternately shifting said mechanisms into operation, substantially as set forth.

13. In an apparatus for the manufacture of pipe, the combination of bells or dies, and a gage arranged in the rear of bells or dies, substantially as set forth.

In testimony whereof I have hereunto set my hand.

PETER BOYD.

Witnesses:
DARWIN S. WOLCOTT,
F. E. GAITHER.

Correction in Letters Patent No. 575,389.

It is hereby certified that in Letters Patent No. 575,389, granted January 19, 1897, upon the application of Peter Boyd, of Wheeling, West Virginia, for an improvement in "Draw-Benches for Manufacturing Pipes," an error appears in the printed specification requiring correction, as follows: In line 87, page 4, the word "bells" should read *balls;* and that the said Letters Patent should be read with this correction therein that the same may conform to the record of the case in the Patent Office.

Signed, countersigned, and sealed this 2d day of March, A. D., 1897.

[SEAL.]
              JNO. M. REYNOLDS,
              *Assistant Secretary of the Interior.*

Countersigned:
 JOHN S. SEYMOUR,
   *Commissioner of Patents.*